INVENTOR.
HERMOND G. GENTRY
BY
Parrott & Richards
ATTORNEYS

April 22, 1958          H. G. GENTRY          2,831,681

MACHINE FOR SETTING UP BOTTLE CARTONS

Original Filed Aug. 11, 1953          18 Sheets-Sheet 4

INVENTOR.
HERMOND G. GENTRY
BY
Parrott & Richards
ATTORNEYS

April 22, 1958 H. G. GENTRY 2,831,681
MACHINE FOR SETTING UP BOTTLE CARTONS
Original Filed Aug. 11, 1953 18 Sheets-Sheet 6

INVENTOR.
HERMOND G. GENTRY
BY
Parrott & Richards
ATTORNEYS

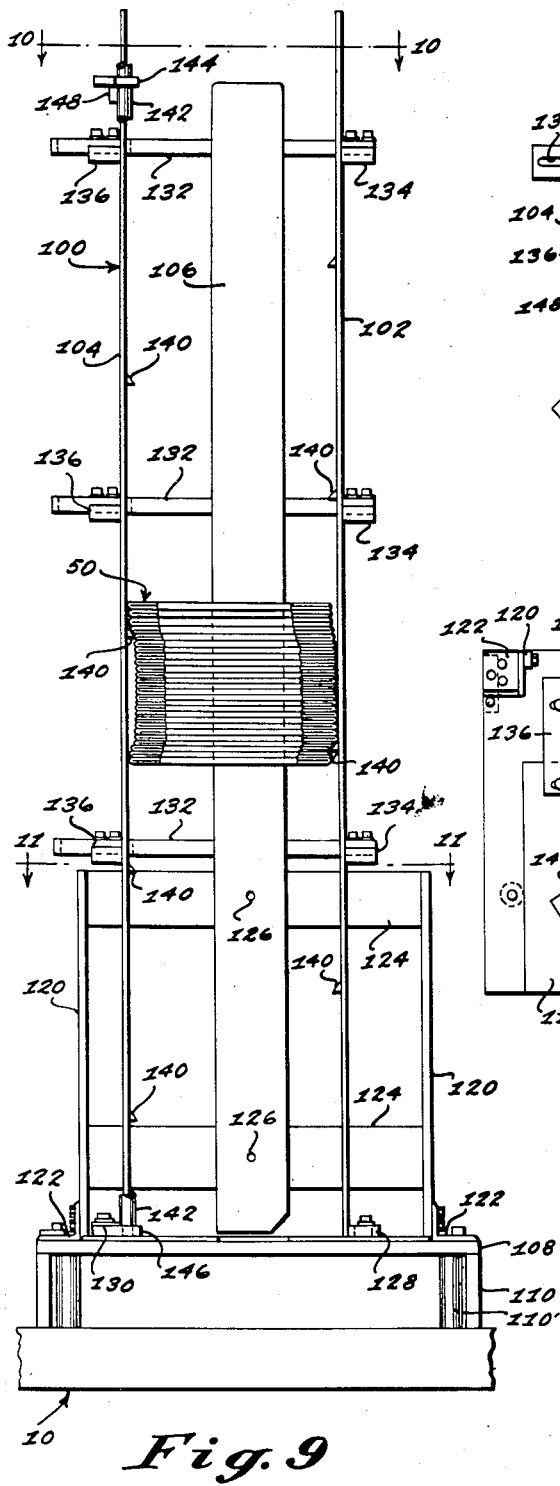
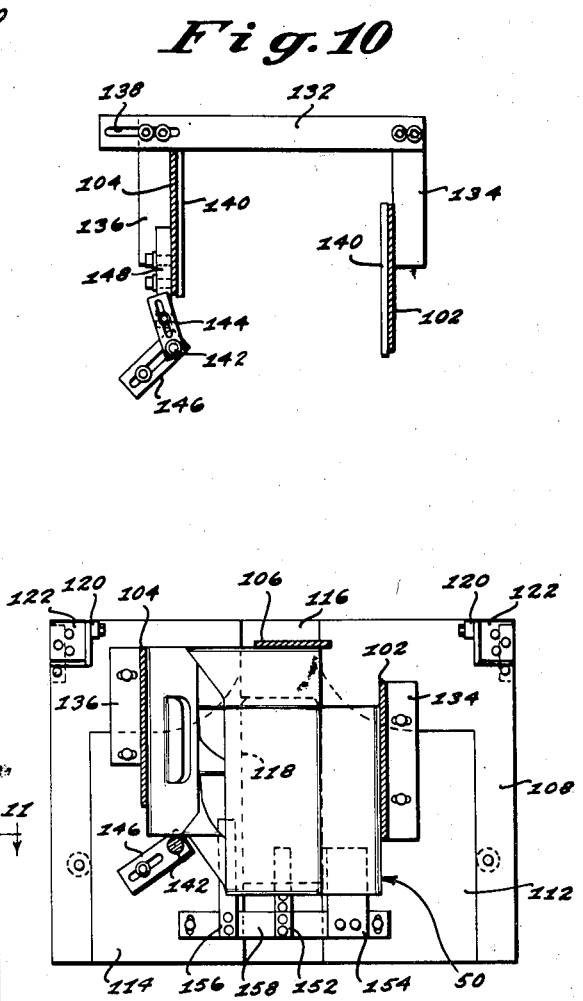

April 22, 1958 H. G. GENTRY 2,831,681
MACHINE FOR SETTING UP BOTTLE CARTONS
Original Filed Aug. 11, 1953 18 Sheets-Sheet 9

INVENTOR.
HERMOND G. GENTRY
BY
Parrott & Richards
ATTORNEYS

April 22, 1958 H. G. GENTRY 2,831,681
MACHINE FOR SETTING UP BOTTLE CARTONS
Original Filed Aug. 11, 1953 18 Sheets-Sheet 12

INVENTOR.
HERMOND G. GENTRY
BY
Parrott & Richards
ATTORNEYS

April 22, 1958 H. G. GENTRY 2,831,681
MACHINE FOR SETTING UP BOTTLE CARTONS
Original Filed Aug. 11, 1953 18 Sheets-Sheet 13

INVENTOR.
HERMOND G. GENTRY
BY
Parrott & Richards
ATTORNEYS

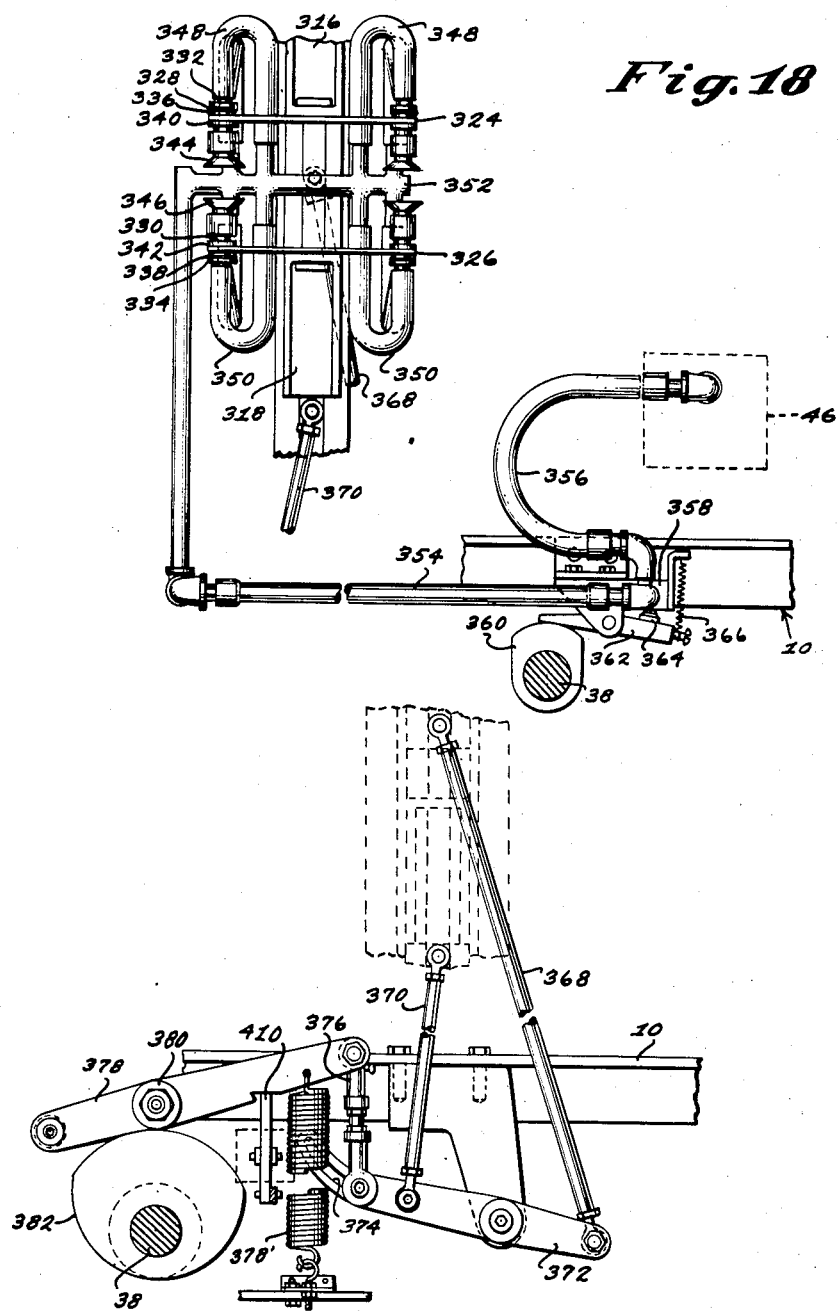

April 22, 1958 H. G. GENTRY 2,831,681
MACHINE FOR SETTING UP BOTTLE CARTONS
Original Filed Aug. 11, 1953 18 Sheets-Sheet 15
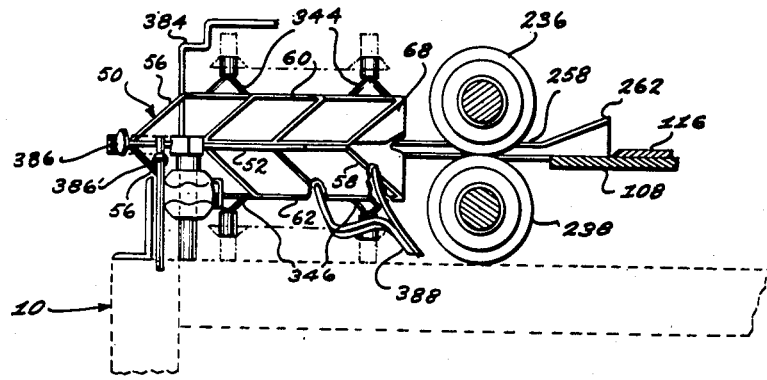
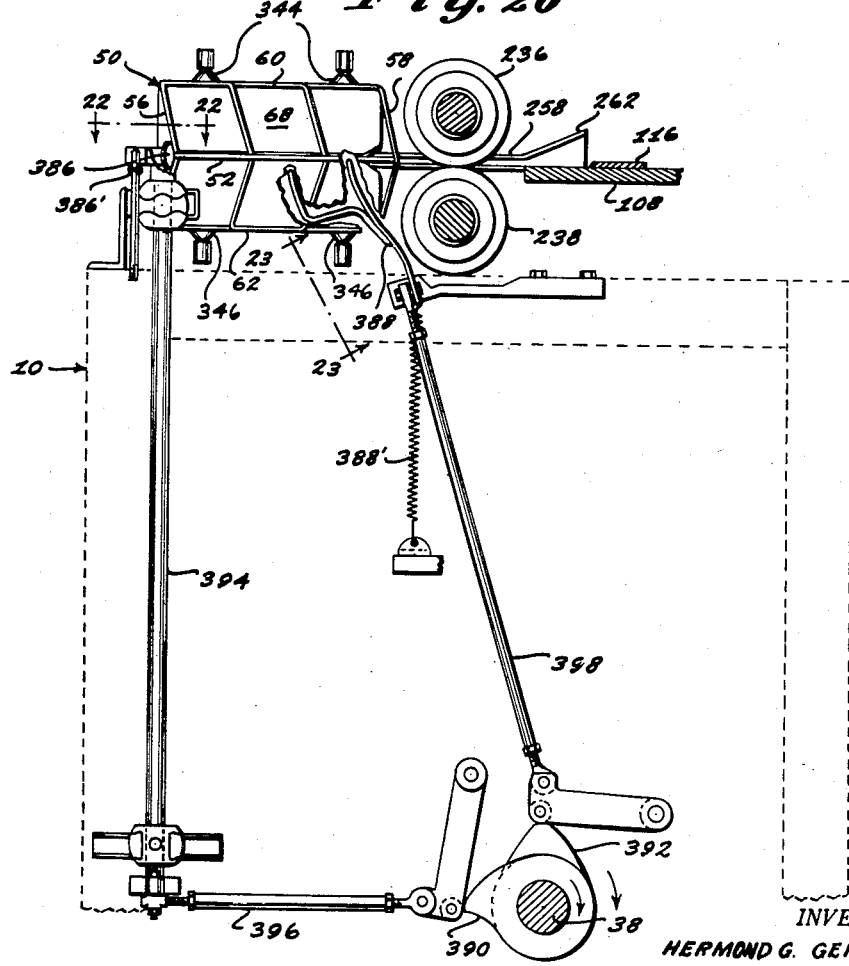
Fig. 20
Fig. 21
INVENTOR.
HERMOND G. GENTRY
BY
Parrott & Richards
ATTORNEYS

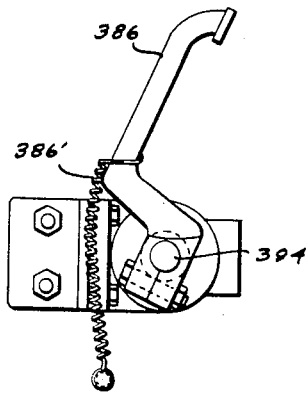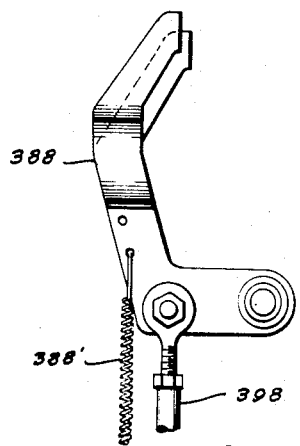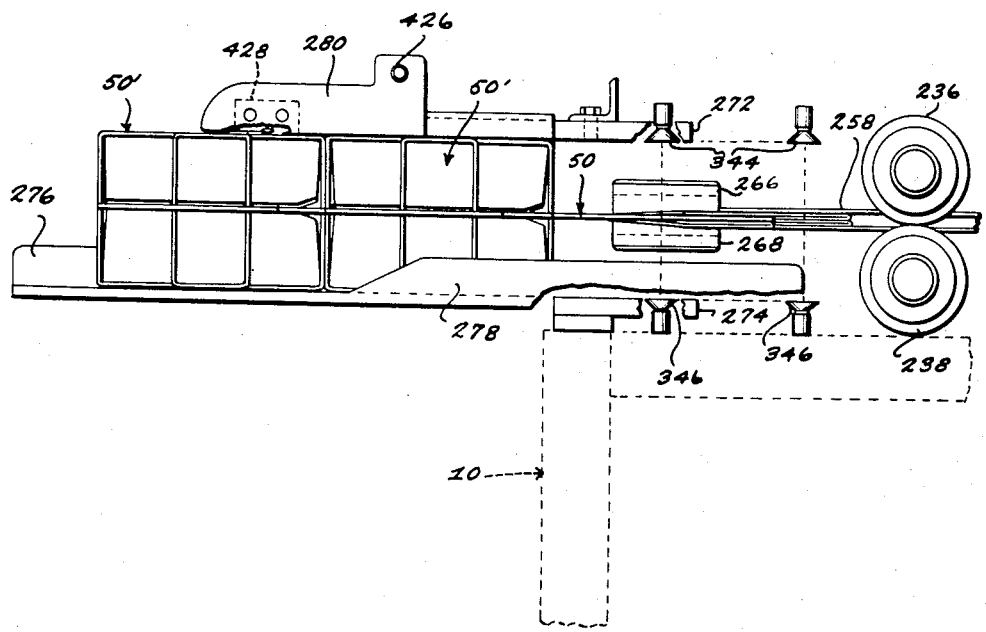

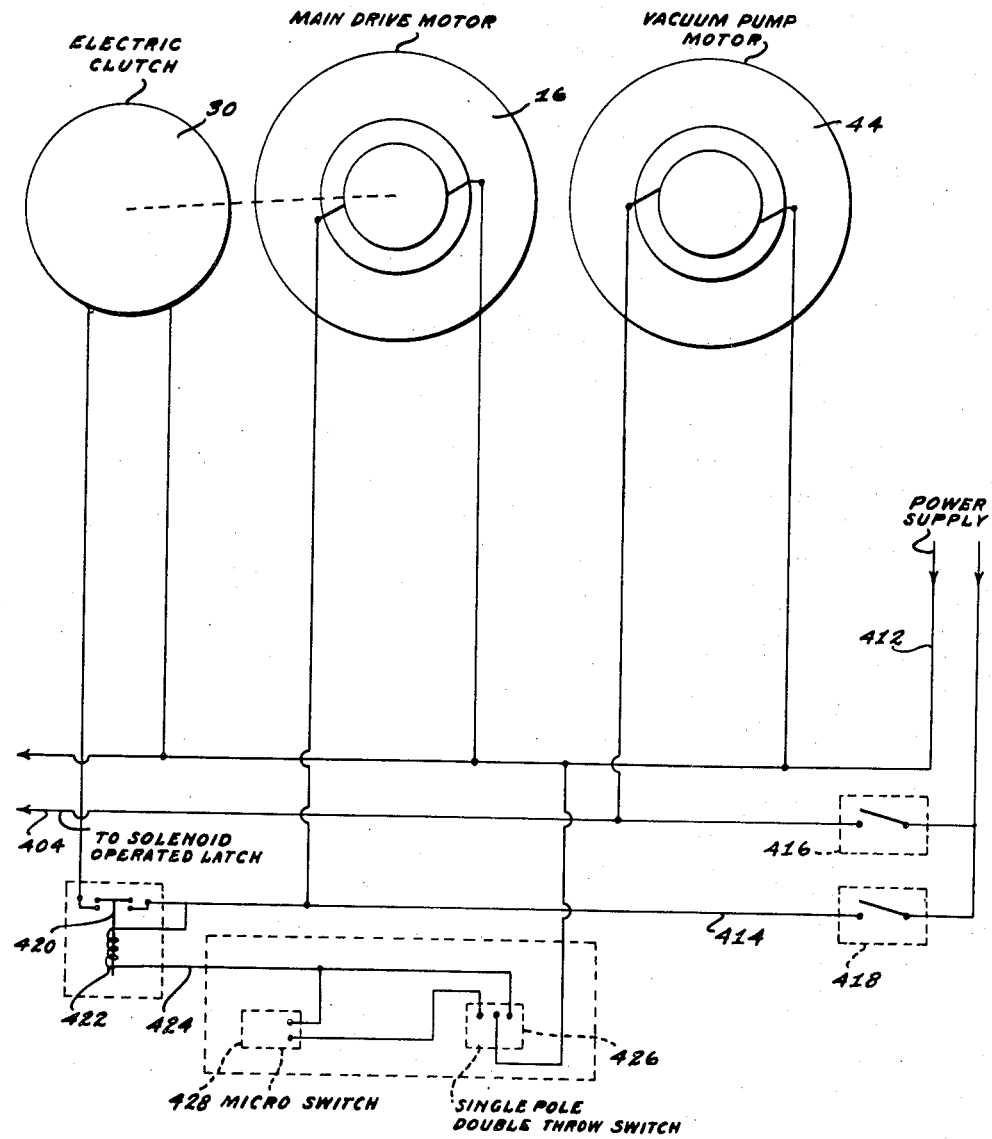

United States Patent Office 2,831,681
Patented Apr. 22, 1958

2,831,681
MACHINE FOR SETTING UP BOTTLE CARTONS

Hermond G. Gentry, Atlanta, Ga., assignor, by mesne assignments, to Mead-Atlanta Paper Company, a corporation of Ohio Original application August 11, 1953, Serial No. 373,476, now Patent No. 2,780,970, dated February 12, 1957. Divided and this application July 13, 1956, Serial No. 597,711

2 Claims. (Cl. 271—61)

This invention relates in general to carton set up machines, and more particularly to a machine by which collapsible bottle cartons of the type used for carrying bottled soft drinks and the like may be set up automatically in an exceptionally effective and rapid manner to prepare them for loading with bottles.

The machine of the present invention is adapted to hold an unusually large stacked supply of the collapsed bottle cartons to be set up, to feed the bottle cartons successively from this stacked supply to a set-up station, and to erect the bottle cartons at this set-up station with a disposition such that the next succeeding collapsed bottle carton fed to the set-up station acts to discharge the bottle carton previously set up. In addition, the machine is arranged so that the various operating elements thereof are actuated from a common driving shaft; and is provided with control means by which intermittent or continuous operation may be obtained selectively, as desired, and by which improper feeding action is detected to stop the setting up operation until normal feeding is reestablished.

These and other features of the present invention are described in further detail below in connection with the accompanying drawings, in which:

Fig. 9 is an elevation of the hopper structure from the open face side thereof;

Fig. 10 is a sectional detail in plan taken substantially at the line 10—10 in Fig. 9;

Fig. 11 is a further sectional detail in plan taken substantially at the line 11—11 in Fig. 9;

Fig. 18 is a generally corresponding fragmentary front face detail showing the arrangement of the set-up section system and control therefor;

Fig. 19 is a further fragmentary detail, taken from a view point opposite that of Fig. 17, and showing the mechanical actuating linkage for the set-up means;

Fig. 20 is a fragmentary side elevation taken from the same view point as Fig. 4, but illustrating only the early stage of the bottle carton set-up operation;

Fig. 21 is a similar fragmentary side elevation illustrating the bottle carton end and bottom lock actuating means, and showing the final stage of the set-up operation;

Fig. 22 is a plan detail of the bottle carton end lock lever taken substantially from the position 22—22 in Fig. 21;

Fig. 23 is a side elevation detail of the bottle carton bottom lock lever taken substantially from the position 23—23 in Fig. 21;

Fig. 24 is a further similar fragmentary side elevation illustrating the manner in which the erected bottle cartons are pushed clear of the set-up position by the succeeding collapsed bottle carton;

Fig. 26 is a schematic electrical diagram showing the remainder of the operating control system.

Figure 1:
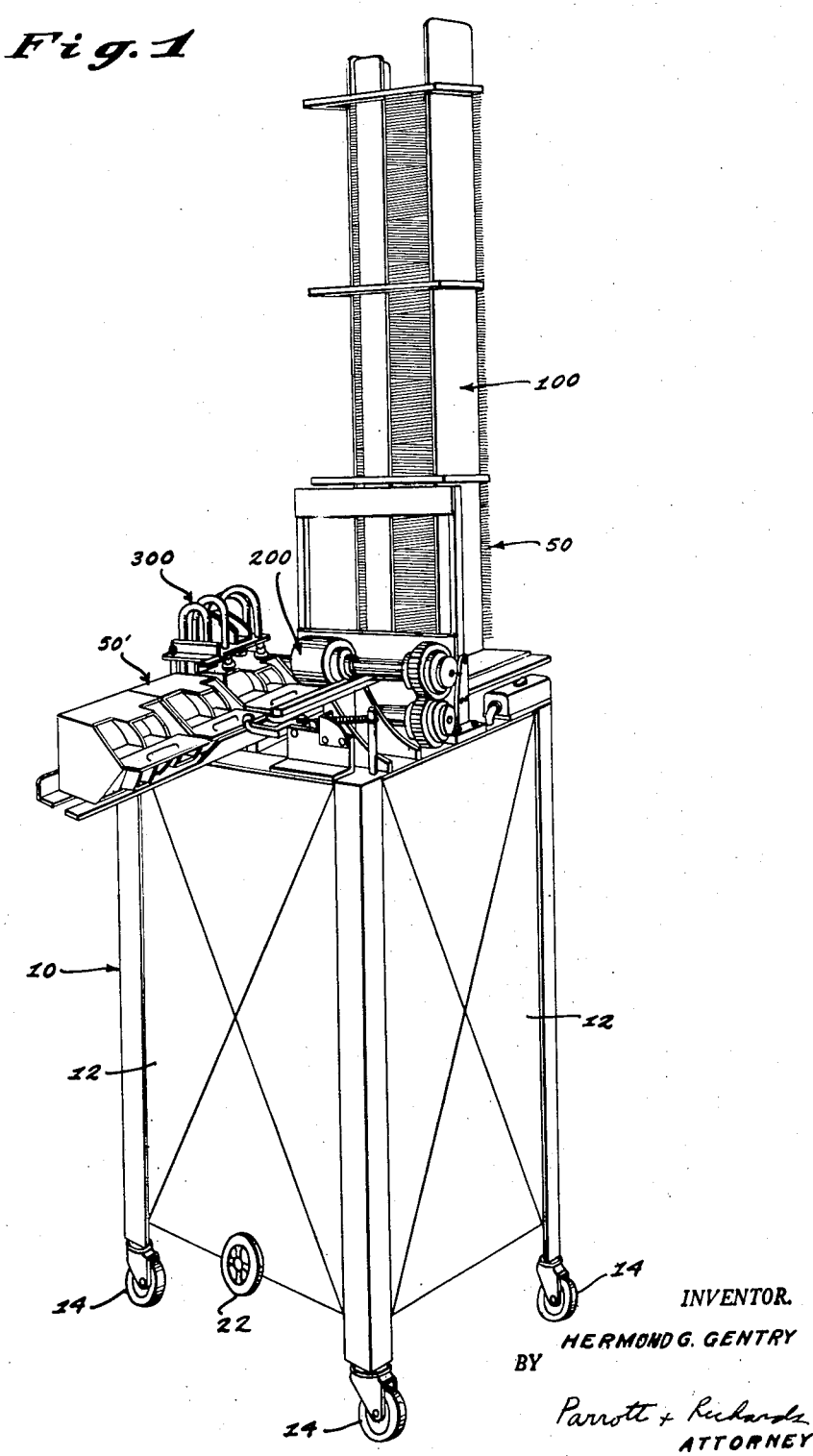
Fig. 1 is a perspective elevation of a bottle carton set-up machine embodying the present invention.
Figure 2:
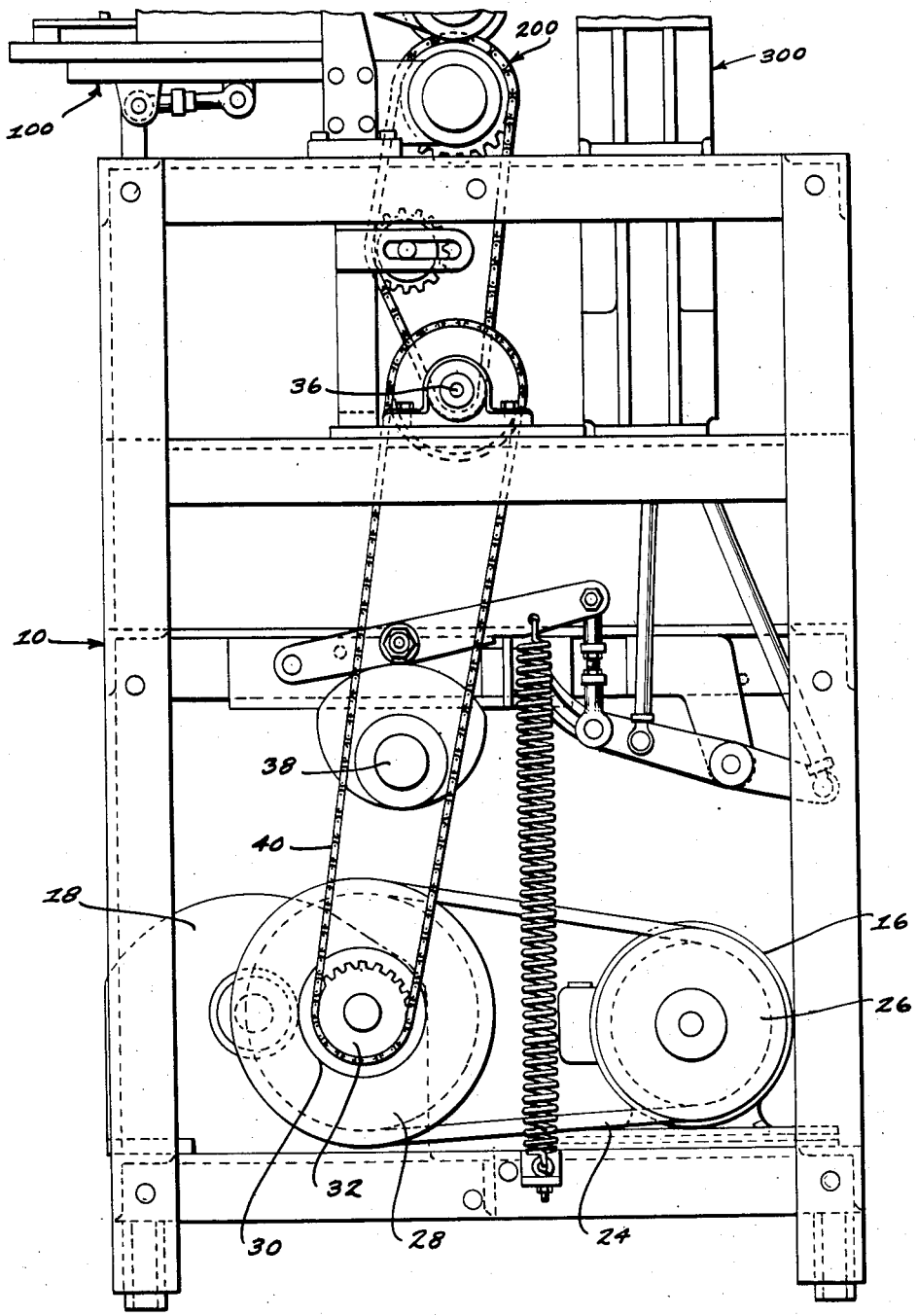
Fig. 2 is a fragmentary rear side elevation as seen from the left in Fig. 1, with the cover panels removed and with only the basic actuating means shown arranged in place.
Figure 3:
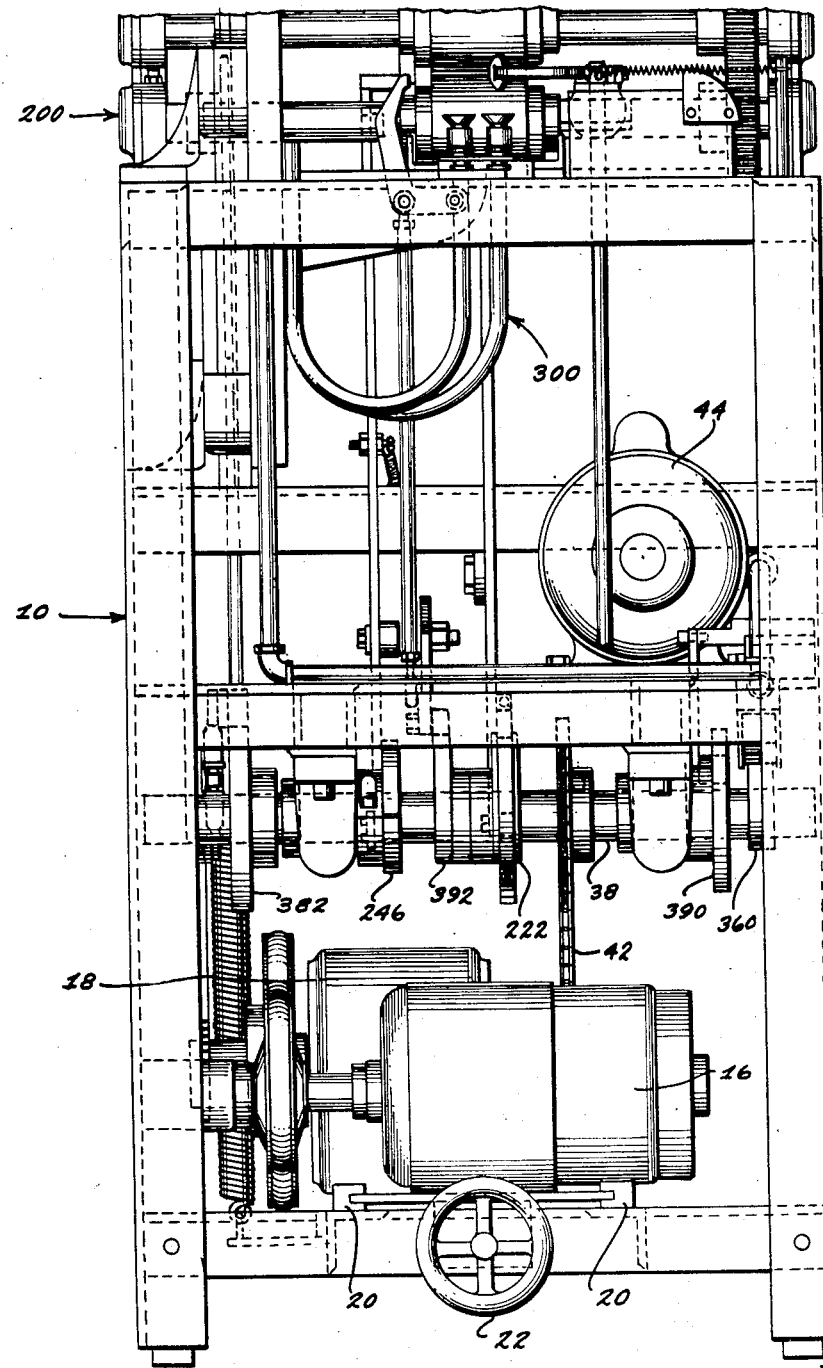
Fig. 3 is a fragmentary left end elevation corresponding to Fig. 2.
Figure 4:
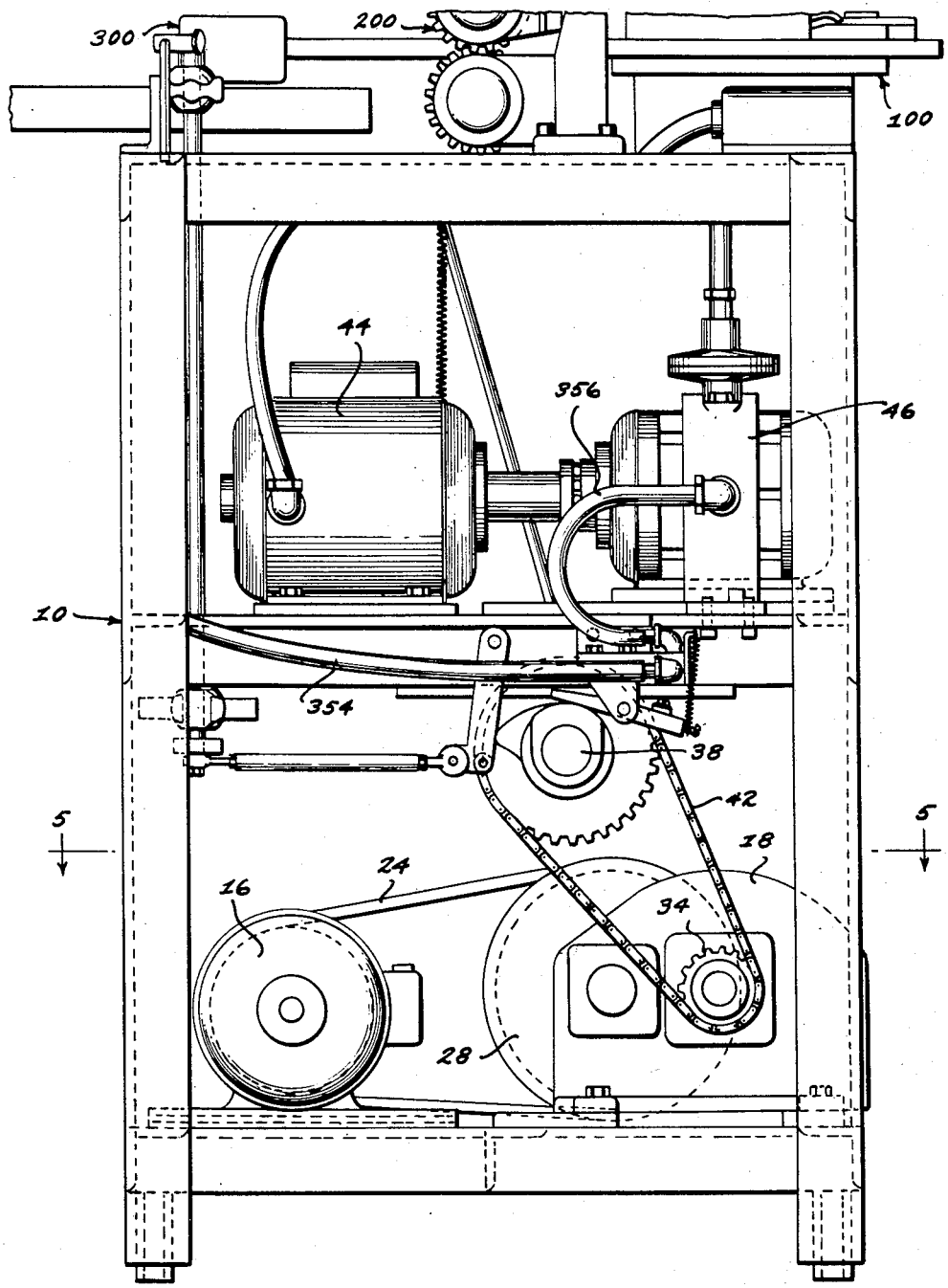
Fig. 4 is a fragmentary side elevation opposite to that shown in Fig. 2.
Figure 5:
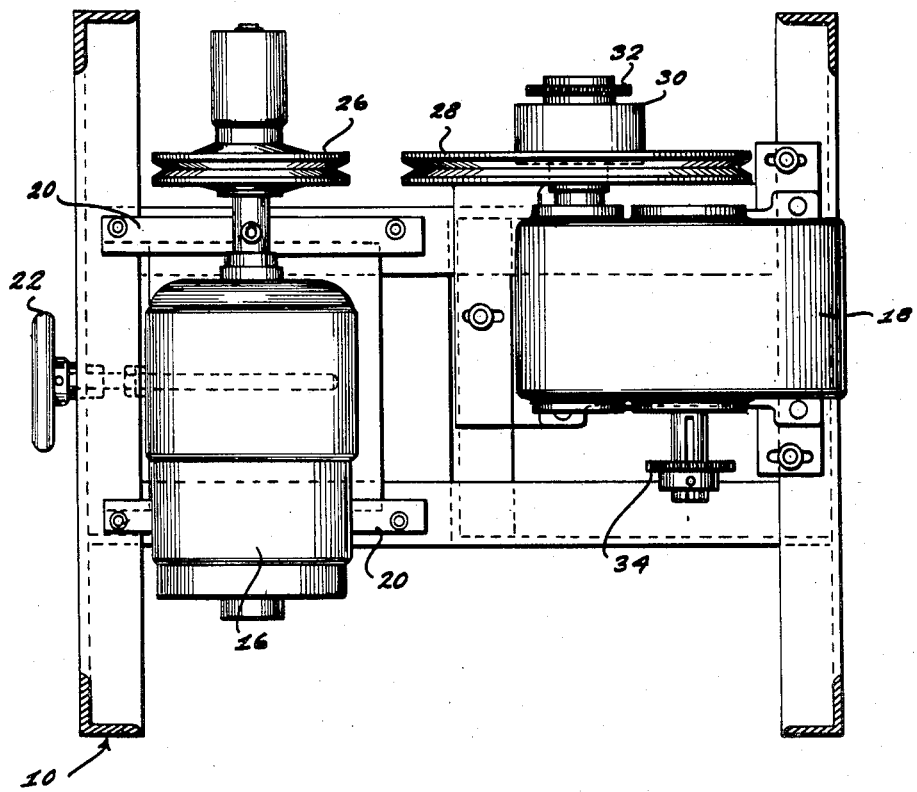
Fig. 5 is a fragmentary sectional plan view taken substantially on the line 5—5 in Fig. 4.

Referring now in detail to the drawings, Fig. 1 shows a machine embodying the present invention in which a supporting frame structure is designated generally by the reference numeral 10; a hopper structure at 100 for containing a supply of collapsed bottle cartons 50 to be set up; feed means at 200 for advancing the collapsed bottle cartons 50 serially from the hopper 100 for setting up; and a set-up mechanism at 300 for manipulating the collapsed cartons 50 so that they are delivered from the machine in erect position as shown at 50' in Fig. 1.

The frame structure 10, as seen in Fig. 1, is suitably fitted with side closure panels 12, and may be mounted on casters 14 to render the machine of the present invention mobile and thereby easily moved and positioned to the best advantage in relation to other equipment or operating stations at which it is to be used.

The arrangement of the frame structure 10 and operating elements supported thereon is further illustrated in Figs. 2 to 5, in which a main drive motor 16 and associated gear reducer 18 are shown mounted adjacent the base of the frame structure 10, the gear reducer 18 being fixed in place and the drive motor 16 being slidable in guide ways 20 from a lead screw adjusting hand wheel 22 by which the drive connection 24 from the motor pulley 26 to the gear reducer sheave 28 may be kept tight.

The sheave 28 is coupled to the input shaft of gear reducer 18 through an electric clutch as indicated at 30, which may be of the type disclosed in U. S. Patent No. 2,606,638, for example, and which allows the drive motor 16 to run continuously while providing for selective intermittent or continuous operation of the machine as is described further below.

First and second drive sprockets 32 and 34 are arranged at the gear reducer 18 for driving a countershaft 36 and a main cross shaft 38, respectively, through sprocket chain connections 40 and 42. The first drive sprocket 32 is coupled by the electric clutch 30 for driving directly from the gear reducer input sheave 28, while the second drive sprocket 34 is mounted on the output shaft of the gear reducer 18.

Upwardly of the frame structure 10 an auxiliary drive motor 44 is mounted together with a vacuum pump 46 that is coupled thereto. This motor 44 and vacuum pump 46, and the main drive motor 16 and related drive connections described, comprise the means by which operation of the bottle carton set up machine of the present invention is actuated.

Figure 6:
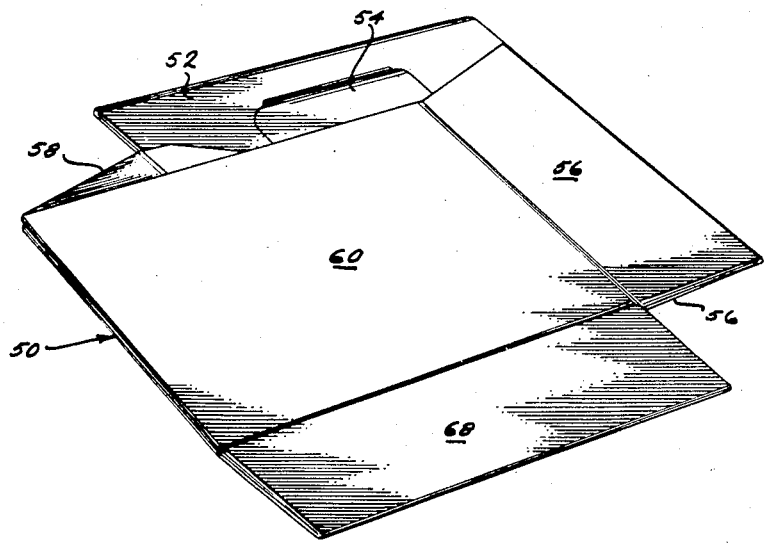
Fig. 6 is a perspective view of a collapsed bottle carton such as may be set up by the machine of the present invention.
Figure 7:
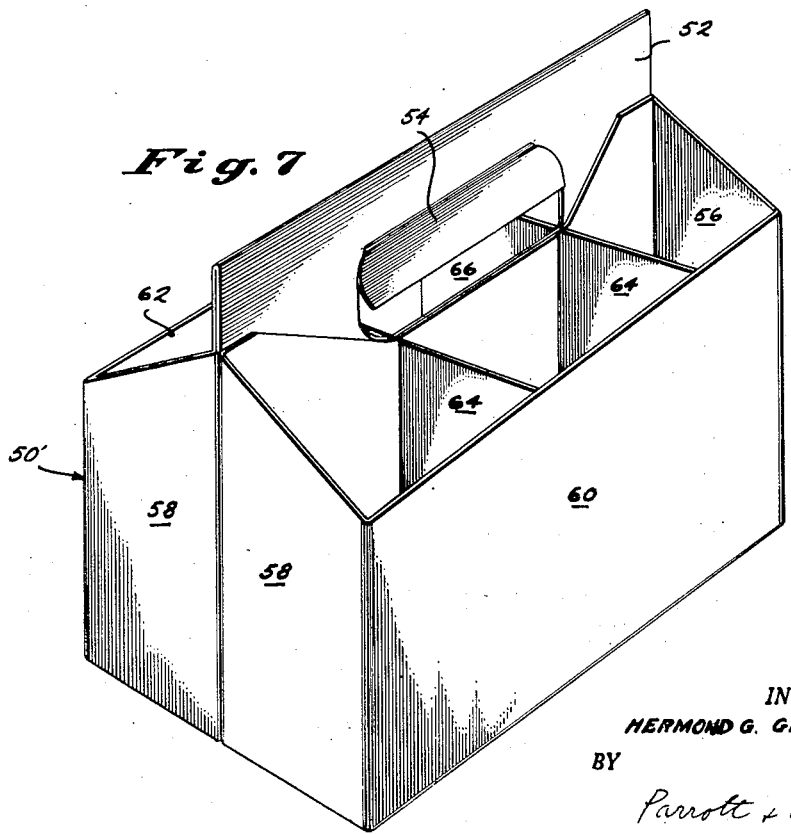
Fig. 7 is a perspective view of the bottle carton shown in Fig. 6 after erection.
Figure 8:
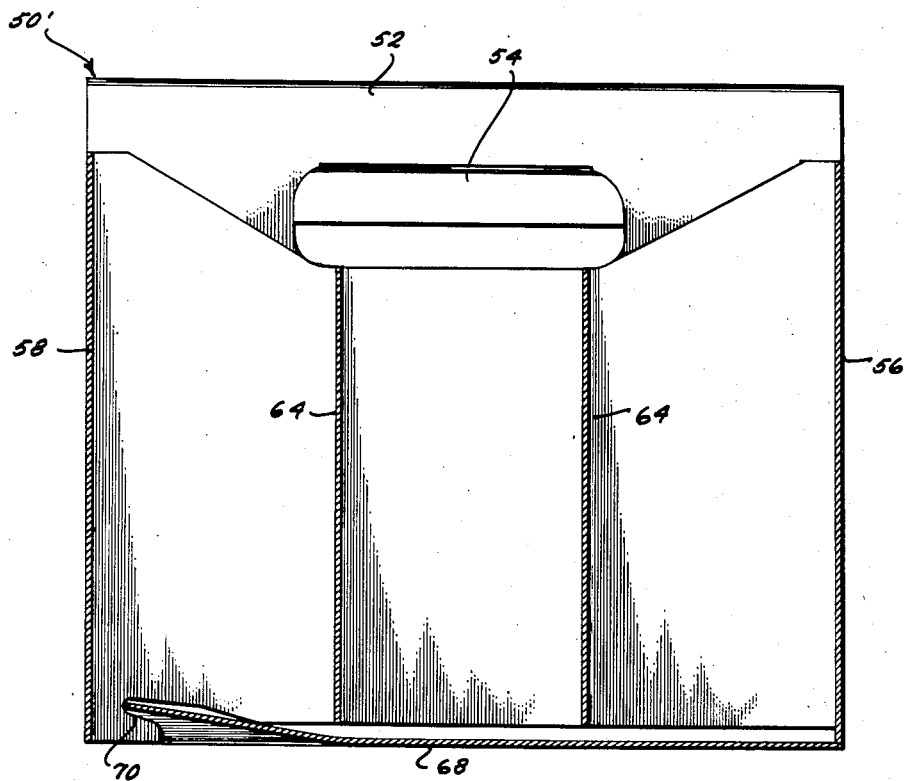
Fig. 8 is a longitudinal section of the erect bottle carton shown in Fig. 7.

The form of bottle carton 50 set up by the machine of the present invention is shown in Figs. 6 to 8, as being of the paperboard type commonly employed for carrying bottles, and which is collapsible to a flat condition for shipping or storing when not in use, but which may be folded to an erect condition (as at 50′) for filling with bottles to be carried. For this purpose, the bottle carton 50 is suitably formed with a central partition and handle portion 52, having a hand hold aperture 54 therein; opposed pairs of end wall panels 56 and 58 foldably joined at each end of the handle portion 52; opposed side wall panels 60 and 62 foldably joined between the outer edges of the end wall panel pairs 56 and 58; intermediate transverse partition panels 64 and 66 foldably joined to and extending respectively between the handle portion 52 and the opposed side wall panels 60 and 62 to form bottle compartments at each side of the handle portion 52; and a medially foldable bottom wall panel 68 foldably joined and extending between the lower edges of the side wall panels 60 and 62 to support a bottle load in the carton 50, the central partition and handle portion 52 being formed at its lower edge with a bottom wall locking notch 70 for engaging an end of the bottom wall panel 68 so that the carton 50 is locked in erect position (see Fig. 8).

The details of the hopper structure 100, in which the collapsed bottle cartons 50 are placed for feeding to be set up by the machine of the present invention, are shown in Figs. 9 to 11. As shown, the hopper 100 is arranged with vertically disposed side plates 102 and 104, and a front plate 106, which serve to support laterally and guide downwardly a stack of collapsed bottle cartons 50 placed therein. These vertical side plates 102 and 104, and the front plate 106, are mounted on a bottom table plate 108 that is secured to the frame structure 10 at front and rear mounting blocks 110 and 110′, and that has right and left slide plates 112 and 114, and a front slide plate 116, arranged on the top face thereof in relation to a central opening at 118 in the bottom plate 108 for a purpose that will be explained presently in describing the arrangement and operation of the feed means 200.

To support the front side plate 106, uprights 120 are secured on the bottom plate 108 by brackets 122, and have cross bars 124 extending therebetween to which the front plate 106 is fastened as at 126, with the bottom edge thereof spaced above the front slide plate 116 properly to provide a feed opening for one collapsed bottle carton 50 from the bottom of a stack thereof in the hopper 100. The side plates 102 and 104 are supported from hold down bars 128 and 130, which are arranged for lateral adjustment at any one of several laterally spaced securing positions on the bottom plate 108 for different sizes of bottle cartons 50, and by a series of spacing bars 132 extending between assembly bars 134 and 136 secured to the outside faces of the side plates 102 and 104. The spacing bars 132 are attached in fixed relation to the right side plate assembly bars 134 but have elongated slots as at 138 for lateral adjustment with respect to the left side plate assembly bars 136, in arranging the lateral spacing of the side plates 102 and 104 for different size bottle cartons 50 as previously mentioned.

The hopper structure 100 comprising the foregoing elements is disposed uprightly on the frame structure 10 in an extent sufficient to allow stacking therein of an exceptional operating supply of the bottle cartons 50 (e. g., 250, which is the normal shipping case quantity of the collapsed bottle cartons 50), and this unusually large capacity of the hopper 100 raises several operating problems. First, the weight of a full stack of bottle cartons 50 in the hopper 100 is substantial so that difficulty is encountered in providing for stripping or feeding the cartons 50 serially from the bottom of the stack with uniform ease. Also, the collapsed bottle cartons 50 are thinner at their bottom wall 68 than throughout the rest of their structure so that they do not form a stable stack of any size. In addition, the bottle cartons 50, being formed of paperboard, become bent or warped rather easily, which often makes it difficult to maintain them in alignment with a feed opening.

Provision is made according to the present invention for eliminating each of these difficulties. To counteract the excessive weight of a stack of the bottle cartons 50 in the hopper 100, the hopper side plates 102 and 104 are fitted in alternately spaced relation with step bars 140 and are spaced at a distance greater than the width of the bottle cartons by an extent at least equal to the inwardly extending portions of stepped bars 140 (see Figs. 9 and 10) that cause the stack of bottle cartons 50 to feed downwardly in a zig-zag fashion, with the result that the weight of the bottle carton stack is largely supported by these step bars 140, leaving a bottom group of bottle cartons 50 in the stack unhampered by this weight in feeding from the hopper 100.

Also, the step bars 140 tend to maintain the bottle cartons 50 level in the unstable stack within the hopper 100, and to provide further means for managing this unstable bottle carton stack, the hopper 100 is also provided with a rear guide rod 142 positioned adjacent the rear edge of left side plate 104 by upper and lower clamp bars 144 and 146 adjustably secured, respectively, on a bracket bar 148 near the upper end of side plate 104 and on the left slide plate 114 at the top face of bottom plate 108. By virtue of this arrangement, the guide rod 142 is disposable just inside of alignment with the left side plate 104 (compare Figs. 9, 10 and 11) to stand behind the adjacent rear corner portion of the stacked bottle cartons 50, and thereby prevent any possibility of the stack tipping outwardly through the open face of the hopper 100, while still allowing the bottle cartons 50 to be easily stacked therein.

Figure 12:
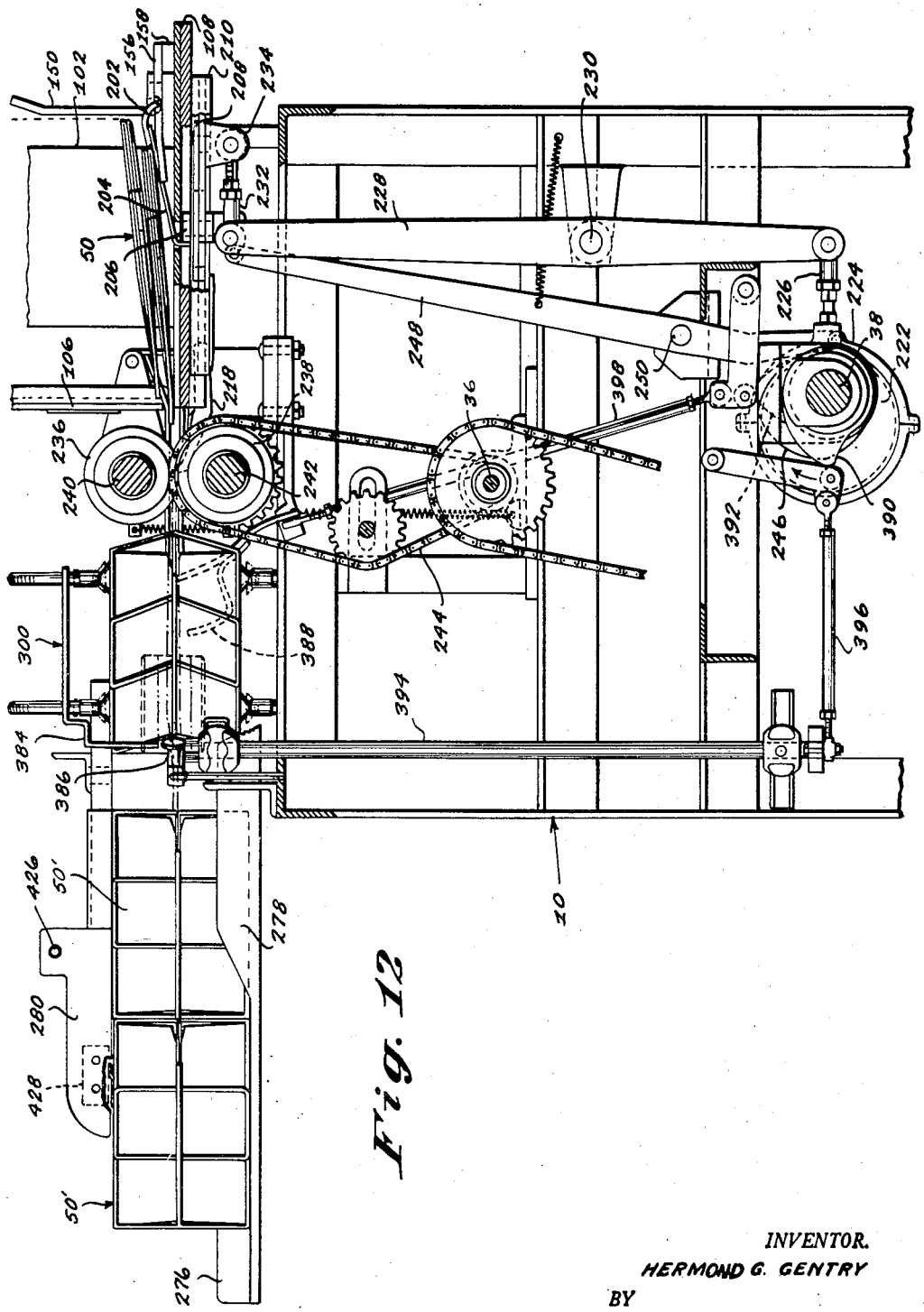
Fig. 12 is a further fragmentary side elevation taken from the same viewpoint as Fig. 4, but shown in section and with only the actuating linkages for the feed means illustrated.

At the bottom of the hopper 100, a rear guide bracket 150 extends upwardly (compare Figs. 11, 12 and 13) in opposed relation to the front plate 106, so that the bottle cartons 50 are guided forwardly and positively positioned in relation to the front plate 106 as they reach the bottom of hopper 100. This rear guide bracket 150 is mounted on a central support bar 152, which together with right and left support bars 154 and 156, extend forwardly and downwardly from a cross elevation bar 158 fixed on top of the right and left slide plates 112 and 114 adjacent the rear edge of bottom plate 108, so that the bottle cartons 50 are elevated at the rear of the hopper 100 in a manner that directs the forward carton edges at the feed opening below the front hopper plate 106 despite any warping or bending that might be present in the bottle cartons 50 being fed.

The arrangement and manner of operation of the feed means 200 by which the stacked bottle cartons 50 are fed from the hopper 100 and advanced for setting up is illustrated in Figs. 12 to 15. To strip the bottle cartons 50 serially from the bottom of hopper 100, a pair of pusher fingers 202 are arranged in spaced relation between the carton support bars 152, 154 and 156 at the bottom of hopper 100. These pusher fingers 202 are mounted on spring arms 204 that bias them upwardly above the support bars 152, 154, and 156 to engage the rear edge of the bottom bottle carton 50 for each feeding stroke. The spring arms 204 are in turn secured to a sliding cross bar 206, that is disposed within the central opening 118 of the hopper bottom plate 108 and is carried by a sliding plate 208 mounted in slotted left and center guides 210 and 212 fastened to the under face of hopper bottom plate 108. The center guide 212 is slotted in both side faces and a further slotted right guide 214 is disposed in relation thereto for also slidably supporting a sliding bar 216 that carries a carton positioning latch finger 218 at the forward end thereof, together with a leaf spring 220 urging the finger 218 upwardly.

Figure 14:
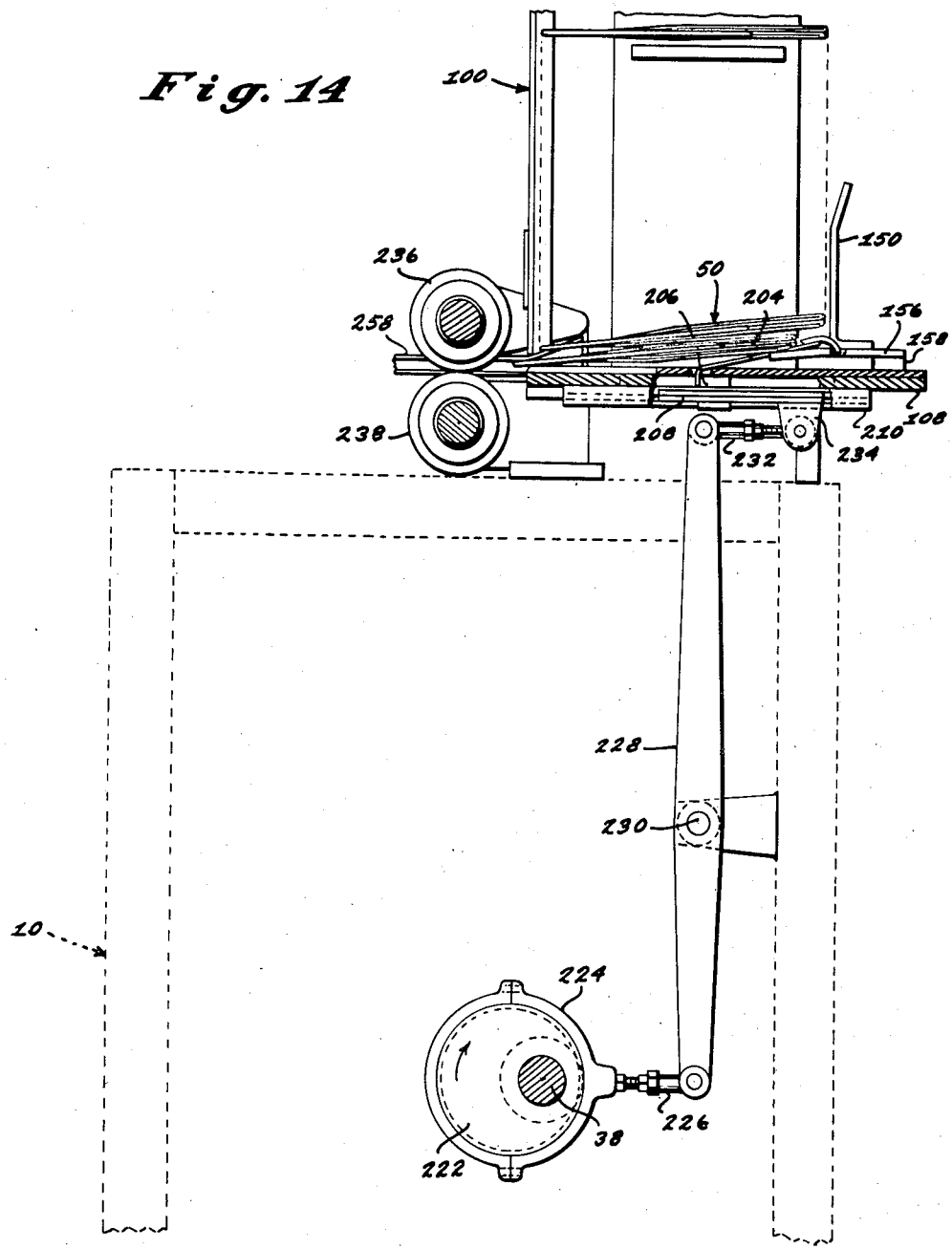
Fig. 14 is a separated detail corresponding generally to Fig. 12, but illustrating only the actuating linkage for driving the hopper pusher fingers.

The actuating linkage for the hopper pusher fingers 202 is shown best in Fig. 14 as comprising a circular eccentric 222 on the main cross shaft 38, which is fitted with a strap 224 having a connecting rod 226 extending therefrom to a pivoted joint at the adjacent end of a lever 228. This lever 228 is fulcrumed on the frame 10 as at 230, and has a further similar connecting rod 232 pivoted at its other end and extending to a pivoted connection with a lug 234 attached at the bottom face of the sliding plate 208 carrying the cross bar 206 on which the hopper pusher fingers 202 are mounted. By virtue of this linkage, a reciprocating motion is imparted to the hopper pusher fingers 202, the stroke of which motion is proportioned to strip the bottle cartons 50 sucessively from the bottom of the stack in the hopper 100 and advance them beneath the bottom edge of the hopper front plate 106 to the nip of a pair of yieldably opposed feed rolls 236 and 238.

These feed rolls 236 and 238 are located just ahead of the hopper front plate 106, and are carried on geared shafts 240 and 242 that are journalled on the frame structure 10 and driven through a sprocket chain connection 244 running from the countershaft 36 to the lower roll shaft 242. The purpose of the feed rolls 236 and 238 is to speed up travel of the bottle cartons 50 from the hopper 100 to the setting up position, so that a previously set-up carton 50' is quickly pushed out of the way by each advancing collapsed bottle carton 50, and operation of the setting up mechanism 300 can therefore be started sooner and allowed more travel time, which smooths out the action of the machine. Also, only a very short reciprocating motion of the hopper pusher fingers 202 is needed with the feed rolls 236 and 238 arranged as noted above.

Figure 15:
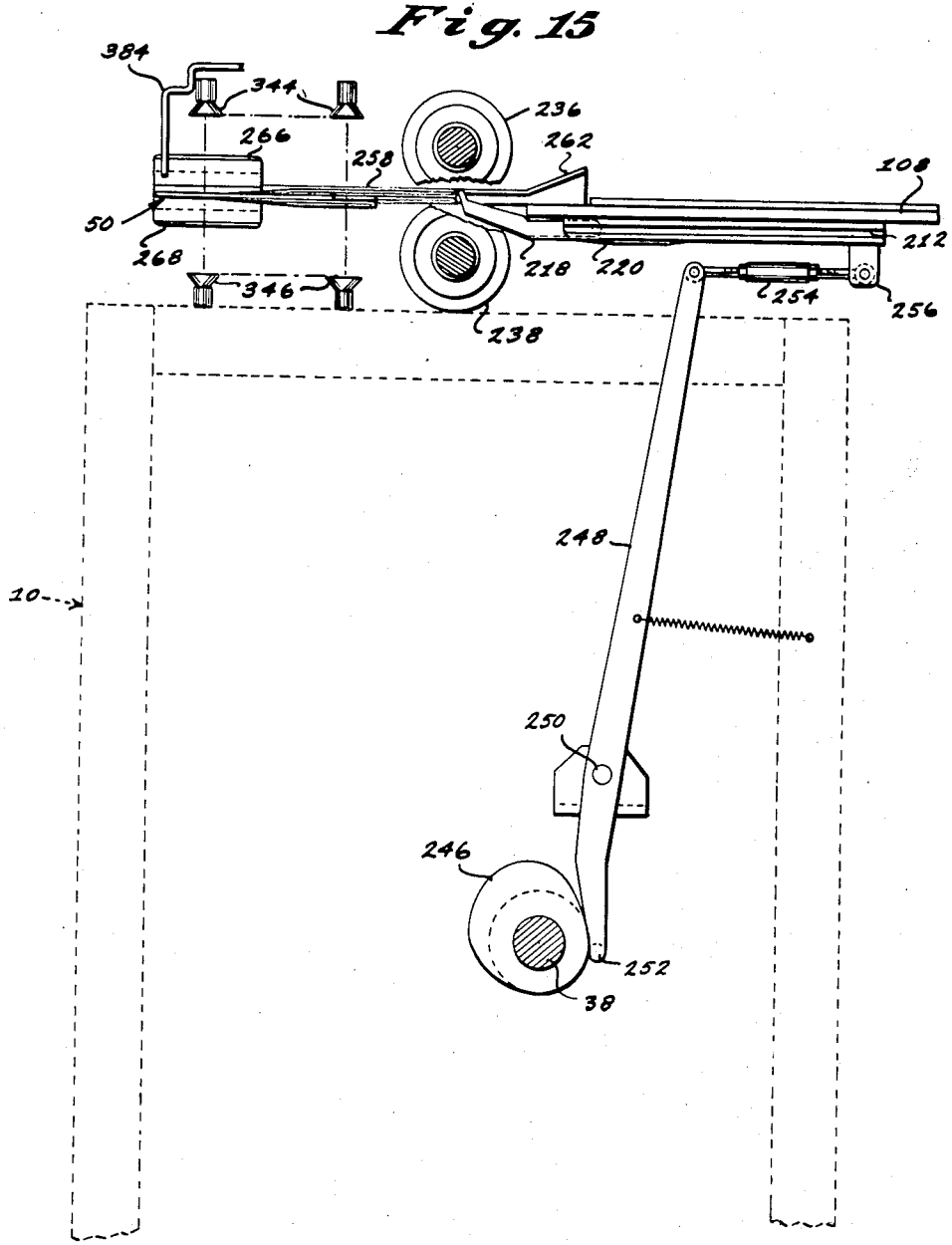
Fig. 15 is a further separated detail also corresponding generally to Fig. 12, but illustrating only the actuating linkage for driving the positioning finger that finally advances the collapsed bottle cartons in position for setting up.

As each collapsed carton 50 clears the feed rolls 236 and 238, the previously mentioned upwardly urged positioning latch finger 218 rises behind the trailing edge of the collapsed carton 50 and advances it finally to setting up position, as illustrated best in Fig. 15. The latch finger 218 is disposed for this purpose in laterally offset relation with respect to the feed rolls 236 and 238 (see Fig. 13), and is operated from a cam 246 on the main cross shaft 38 by a lever 248 fulcrumed on the frame structure 10 as at 250 and having at one end a follower 252 for the cam 246 and at the other end a connecting rod 254 running to a lug 256 attached at the bottom face of sliding bar 216 on which the latch finger 218 is carried. The lever 248 is biased in following relation with respect to the cam 246, so that reciprocation of the latch finger 218 results in advancing finally each carton 50 from the feed rolls 236 and 238, with the finger 218 retracting beneath the succeeding carton 50 being fed by the rolls 236 and 238 to recover for the next advance.

Figure 13:
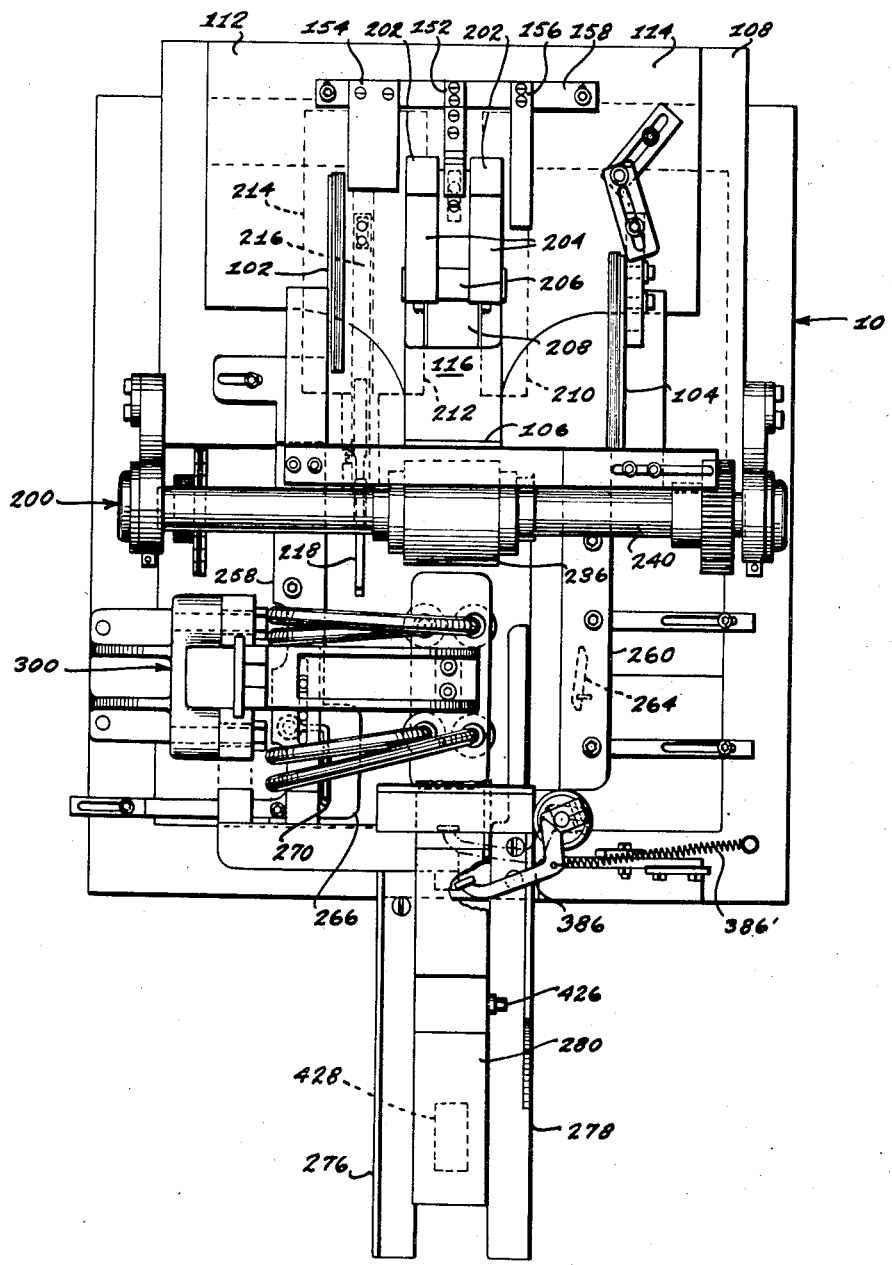
Fig. 13 is a plan view corresponding generally to Fig. 12.

In being advanced in this manner, the collapsed cartons 50 are guided in slotted right and left guideways 258 and 260, both of which are mounted for lateral adjustment and extend forwardly from the front edge of the hopper bottom plate 108, and both of which have flared receiving end portions as at 262 in Fig. 15. In addition, the left guideway 260 is fitted with a spring positioned pressure lever 264 (see Fig. 13) by which the cartons 50 are pressed in close sliding alignment with the right guideway 258 as the setting up position is reached; and the extending end portion of the right guideway 258 is formed with lateral inwardly extending top and bottom lips 266 and 268, with a retard spring 270 mounted to extend through the top lip 266 (as seen in Fig. 13) to press the leading edge of an advancing carton 50 against the bottom lip 268 and there slow the carton advance so that it will stop properly at setting up position. It should also be noted that the top and bottom right guideway lips 266 and 268 are formed upwardly and downwardly toward their extending edges (compare Fig. 15) so as to allow clearance for erection of the carton bottom wall 68 in the course of the setting up operation described just below.

Figure 16:
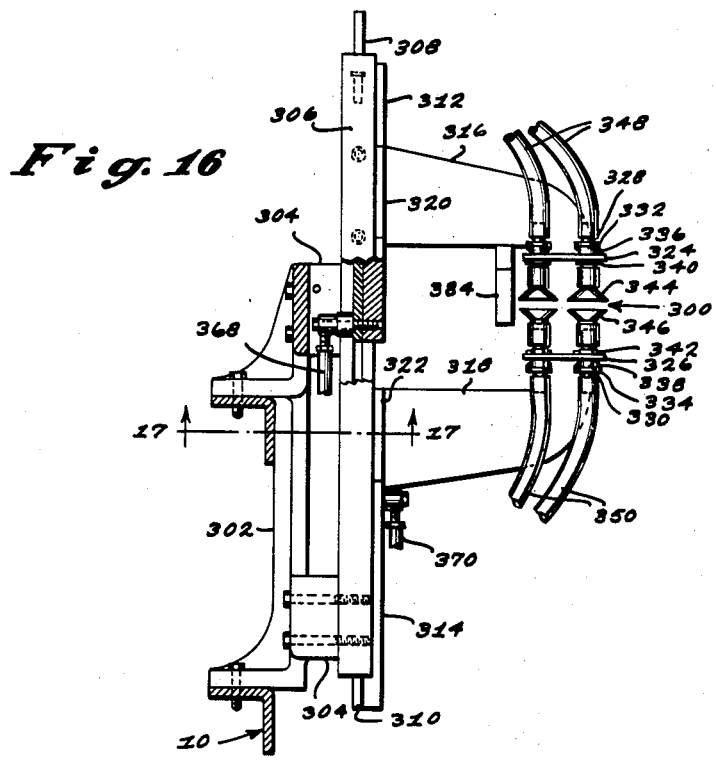
Fig. 16 is a side elevation showing the supporting structure of the carton set-up means.
Figure 17:
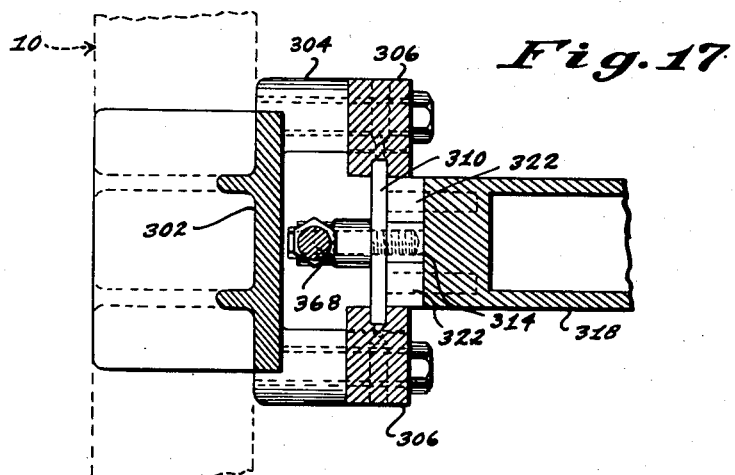
Fig. 17 is a sectional detail taken substantially on the line 17—17 in Fig. 16.

The set-up mechanism 300 operates to grip by suction the respective opposed side wall panels 60 and 62 of each collapsed bottle carton 50 advanced to the setting up position and move these side walls 60 and 62 apart so that all of the carton elements are caused to shift toward their erect condition. Fig. 16 shows the supporting structure for the set-up mechanism 300, which comprises a support bracket 302 attached to the frame structure 10 and formed with mounting block portions 304 at which a pair of vertically disposed slotted guides 306 are secured in spaced relation (compare Fig. 17). Upper and lower slide plates 308 and 310 are slidably arranged between these guides 306, and each of the slide plates 308 and 310 is fitted with a central reinforcing rib 312 or 314 and has horizontally extending bracket arms 316 and 318 mounted thereon, spacers 320 or 322 being arranged at each side of the reinforcing ribs 312 and 314 to effect this mounting.

The bracket arms 316 and 318 carry the previously mentioned suction gripping means of the set-up mechanism 300 and for this purpose are fitted at their extending ends with suction cup support plates 324 and 326, each of which are arranged to carry four suction cup adapters 328 or 330. These adapters 328 and 330 are formed with flanges 332 and 334 provided to engage leaf springs 336 and 338 which are anchored on the back faces of the support plates 324 and 326 for yieldably positioning the adapters 328 and 330 thereon, lock washers 340 and 342 being fitted to grooves (not shown) in the adapters 328 and 330 to bear against the opposite faces of the support plates 324 and 326 and thereby retain the adapters 328 and 330 yieldably in place against the pressure of the leaf springs 336 and 338.

The suction system for the set-up mechanism 300 is illustrated in Fig. 18 as comprising suction cups 344 and 346 fitted beyond the lock washers 340 and 342 on the large ends of the adapters 328 and 330 at the opposed faces of the support plates 324 and 326, and which suction cups 344 and 346 form the means for gripping the carton side walls 60 and 62 to move them apart for erection of the collapsed cartons 50 (see Figs. 20 and 21). At the other small ends of the adapters 328 and 330 flexible hose connections 348 and 350 are fitted that run from a manifold 352 having further flexible hose connections 354 and 356 running thereto through a control valve 358 to the previously mentioned vacuum pump 46. The control valve 358 is operated from a cam 360 carried on the main cross shaft 38 through a following lever 362 to apply and release the vacuum suction at the suction cups 344 and 346 with proper timing during the setting up operation. For this purpose, the following lever 362 is fitted with a valve closure element 364 (such as a rubber seat or the like) and is yieldably biased, as by a spring 366, to follow the cam 360 so as to maintain the valve closure 364 seated except when the high cam portion is reached, as shown. When seated, the valve closure 364 causes full suction from the vacuum pump 46 to be applied at the suction cups 344 and 346, while opening of the valve closure 364 by the high portion of cam 360 results in breaking the suction from the vacuum pump 46 and thereby releasing the gripping action of the suction cups 344 and 346.

In order to actuate mechanically the suction cups 344 and 346 for setting up the collapsed bottle cartons 50 successively as the gripping suction thereat is applied and released in the above noted manner, push rods 368 and 370 are connected from opposite legs of a rocking lever 372 to the upper and lower slide plates 308 and 310, respectively, as seen in Fig. 19 (compare Figs. 16 and 18). The rocking lever 372 is further fitted at a selected position in an adjustment slot 374 therein with a connecting rod 376 to a pivoted lever 378 carrying a follower 380 for an operating cam 382, by which the slide plates 308 and 310, and consequently the suction cups 344 and 346, are caused to open and close for the setting up operation, the pivoted lever 378 being maintained in following relation with respect to the operating cam 382 by a tension spring 378'.

The collapsed bottle cartons 50 are finally located at setting up position by a stop member 384 mounted to move with the upper suction cups 344 (see Fig. 16, and compare Figs. 15 and 20), in the path of the collapsed carton bottom wall 68. When thus located the respective carton side walls 60 and 62 are gripped by the suction cups 344 and 346, when they start to move apart for the setting up operation. Just before the gripped bottle carton 50 is fully opened, as seen in Fig. 20, an end lock lever 386 starts pushing on the adjacent leading carton end walls 56 and continues until the carton 50 is fully opened and the end walls 56 have been pushed past center (see Fig. 21); at which time a bottom lock lever 388 moves laterally to push in and hold the bottom wall 68 near the locking notch 70 until the end lock lever 386 moves away to allow springing back of the carton structure so that the bottom wall 68 is engaged by the locking notch 70, after which the bottom lock lever 388 moves away to leave the erected carton 50' ready to be discharged from the machine, as illustrated in Fig. 24.

Operation of the end lock lever 386 and bottom lock lever 388 just described above is shown in Fig. 21 as being actuated from operating cams 390 and 392, respectively, carried on the main cross shaft 38. The end lock lever 386 is fixed for this purpose at the upper end of a vertical shaft 390 that is oscillated through a linkage 392 from the operating cam 390, while the bottom lock lever 388 is rocked by a similar linkage 398 from the operating cams 392, both lock levers 386 and 388 having springs 386' and 388' tensioned therefrom to maintain them in following relation to the respective operating cams 390 and 392.

After erection of the bottle carton 50' at the setting up position, they are discharged from the machine by the feeding of the next succeeding collapsed bottle carton 50 in the manner indicated in Fig. 24. In order to free the erect carton 50' from the suction cups 344 and 346 for discharge in the way, upper and lower carton release arms 272 and 274 are mounted to extend between the suction cups 344 and 346 adjacent the leading end of the carton 50' and at the respective levels of the erect side walls 60 and 62, so that as the suction cupas 344 and 346 are moved apart to fully open position and the suction thereat from vacuum pump 46 is released, the carton release arms 272 and 274 serve to break any residual grip of the suction cups 344 and 346 on the carton side walls 60 and 62.

Figure 25:
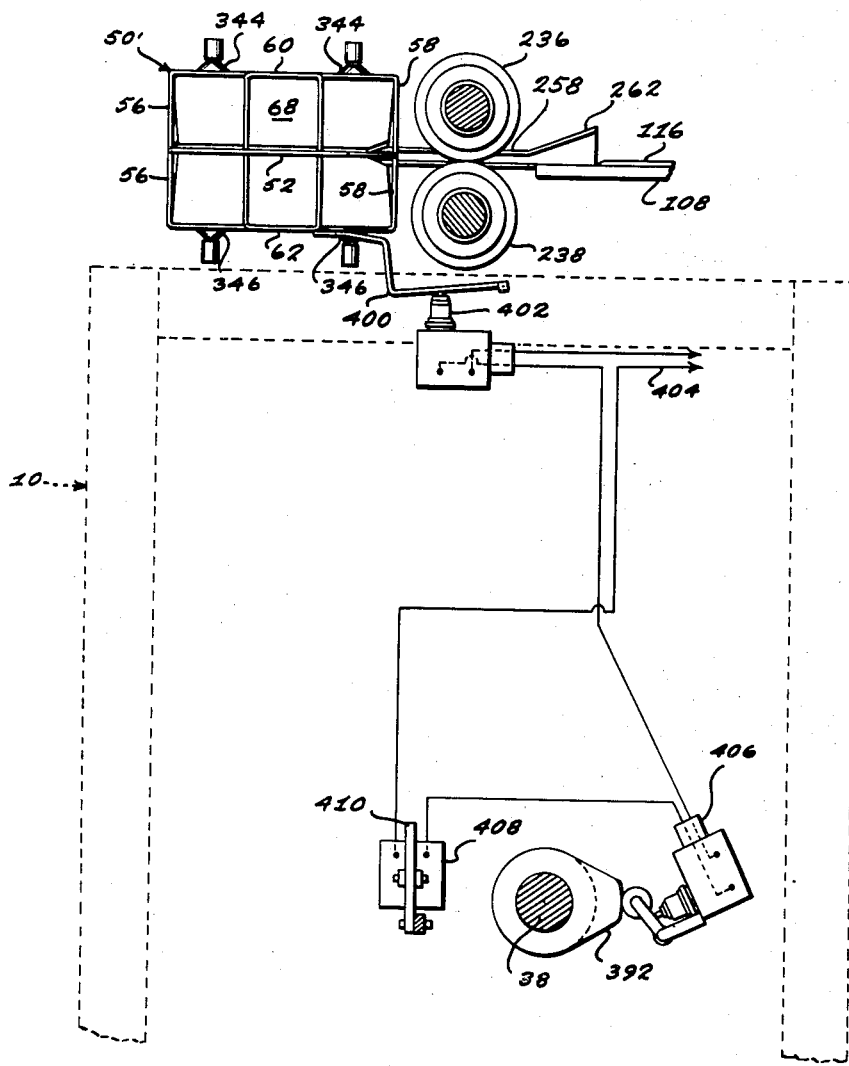
Fig. 25 is a schematic electrical diagram illustrated in relation to a still further similar fragmentary side elevation, and showing part of the operating control system for the machine of the present invention.

The discharged erect cartons 50' are received beyond the setting up position in spaced right and left bottom take off guides 276 and 278, over which an upper centrally arranged takeoff guide 280 is provided to support an element of an electrical operating control system for the machine. Part of this control system is illustrated in Fig. 25 in which means are shown for stopping the machine if an erect carton 50' is not discharged on time from the setting up position through failure of the succeeding collapsed carton 50 to feed properly or for any other reason. The means illustrated in Fig. 25 comprises an upwardly biased spring lever 400 disposed as a feeler for the erect cartons 50' at the setting up position, the lever 400 being depressed by the downwardly disposed side wall 62 of an erect carton 50', and left free to spring upwardly when there is no erect carton 50' at this position.

Below the spring feeler lever 400, a first normally open micro switch 402 is arranged to be closed by the lever 400 when it is depressed. This micro switch 402 is connected in a line circuit 404 in series with a second normally open micro switch 406 and a solenoid relay 408. The second normally open micro switch 406 is arranged for operation from the previously mentioned bottom lock operating cam 392 so that it is periodically closed at a given interval after erection of the carton 50', this interval being sufficient to allow adequate time for discharge of the erect carton 50' from the setting up position by a succeeding collapsed carton 50, but not long enough to allow closing movement of the suction cups 344 and 346 to start again.

With this arrangement, it will be seen that as long as the erect cartons 50' are discharged on time from the setting up position, closing of the micro switches 402 and 406 will never coincide, so that the line circuit 404 to the relay 408 will remain open. However, if an erect carton 50' is not discharged for any reason from the setting up position, the result will be to maintain the first micro switch 402 closed, through depression of the spring lever 400 by the downwardly disposed side wall 62 of the undischarged carton 50', until the second micro switch 406 is closed by the operating cam 392, thus completing the line circuit 404 to energize the relay 408 just as closing movement of suction cups 344 and 346 starts but before they are allowed to close again on the undischarged erect carton 50'.

Energizing of the relay 408 causes shifting of a pivoted latch lever 410 operated thereby beneath the pivoted following lever 378 for the operating cam 382 from which the opening and closing movement of the suction cups 344 and 346 is actuated (compare Fig. 19 with Fig. 25). As a result, the pivoted lever 378 is held against the pull of its spring 378' by the relay latch lever 410 so that it cannot follow the operating cam 382, and closing movement of the suction cups 344 and 346 is thereby prevented, so that they will remain stationary until proper feeding of the collapsed cartons 50 is started again or until the undischarged erect carton 50' is otherwise removed from the setting up position to release the spring lever 400 and allow the first micro switch 402 to remain open for the next cycle of movement for the suction cups 344 and 346, the relay latch lever 410 being otherwise shifted to latching position during each cycle.

Fig. 26 shows schematically the remainder of the operating control system, and in which the above mentioned line circuit 404 for the suction cup latching means is seen running from a main line circuit 412 with one leg thereof connected in parallel with a third circuit leg 414, and line switches 416 and 418 arranged in each of the parallel circuit legs. The vacuum pump motor 44 is connected directly across the line 404 to run continuously from the main line 412 under the control only of the line switch 416. Likewise, the main drive motor 16 is connected across the series leg of the circuit 404 and the third circuit leg 414 to run continuously under the control of line switch 418. The electric clutch 30 is connected in parallel to the drive motor 16 with a normally open relay actuated contactor 420 interposed in the third circuit leg 414, so that the drive motor 16 is not engaged by the electric clutch 30 until the relay contactor 420 is closed. The actuating coil 422 for the relay contactor 420 is shunt connected as at 424 through a single pole, double throw, selector switch 426, with a normally closed micro switch 428 interposed at one position of the selector switch 426 (i. e., the left position as seen in Fig. 26).

This micro switch 428 is disposed on the previously mentioned upper control takeoff guide 280 at a position to sense the erect cartons 50' discharged from the setting up position, suitably the second erect carton 50' from the setting up position as illustrated in Fig. 24, and the selector switch 426 may be conveniently located for manipulation at an adjacent position on the upper takeoff guide 280. With this arrangement, as long as less than two erect cartons 50' are on the takeoff guides 276, 278, and 280, the normally closed micro switch 428 will remain closed, and the machine will continue running with the selector switch 426 at the left position. As soon as two erect cartons 50', however, are discharged successively from the setting up position, the micro switch 428 will sense the leading one and will be opened thereby to deenergize the relay contactor 420 and disconnect the electric clutch 30 to stop the machine until the leading erect carton 50' is removed.

Alternatively, the machine can be made to discharge the erect cartons 50' continuously by shifting to the right position as seen in Fig. 26, which will result in by-passing the micro switch 428 and maintaining the relay contactor 420 continuously closed. Finally, shifting of the selector switch 426 to its central position (in Fig. 26) results in disconnecting the shunt circuit 424 altogether and thereby deenergizing the relay contactor 420 to stop the machine entirely when desired.

This application is a division of my copending application Serial No. 373,476, filed August 11, 1953, now Patent No. 2,780,970, issued February 12, 1957, and claims only the hopper structure for collapsed bottle carton, the means for setting up the collapsed bottle cartons being claimed in Patent No. 2,780,970, and the means for stripping the collapsed bottle cartons being claimed in copending application Serial No. 598,377, filed July 17, 1956.

The present invention has been described in detail above for purposes of illustration only and is not intended to be limited by this description or otherwise except as defined in the appended claims.

I claim:

1. In a machine for setting up collapsible bottle cartons in which a hopper structure is provided to contain a stacked supply of said bottle cartons in collapsed form together with means for partially stripping successively from said stacked supply the lowermost bottle carton from said hopper structure, and in which the bottle cartons of said stacked supply increase substantially in aggregate thickness rearwardly of the carton edge that leads during stripping of said cartons from said hopper structure, said hopper structure comprising vertically disposed front and opposed side plates for supporting said stacked supply of bottle cartons laterally, said side plates being fitted at the inside faces thereof, respectively, with alternately spaced stepped bars that cause the stack of bottle cartons to feed downwardly in a zig zag fashion, said opposed side plates being spaced at a distance greater than the width of the bottle cartons by an extent at least equal to the inwardly extending portion of said stepped bars, said stepped bars tending to maintain the bottle cartons level in the stack within the hopper and extending from said side plate faces sufficiently to cause lateral displacement of the bottle cartons at each stepped bar as the lowermost bottle carton is stripped and thereby dispose successive vertical portions of said stacked supply for localized support by the next lower stepped bar.

2. In a machine for setting up collapsible bottle cartons as defined in claim 1 and further characterized in that a vertical guide rod is mounted for lateral adjustment adjacent the rear edge of one of said side plates, said guide rod disposed just inside of alignment with said side plate to stand behind the adjacent rear corner portion of the stacked bottle cartons and thereby prevent tipping of the stacked cartons outwardly through the open face of the hopper while still allowing the bottle cartons to be easily inserted laterally of said guide rod at the rear of the hopper structure.

References Cited in the file of this patent
UNITED STATES PATENTS

| | | |
|---|---|---|
| 1,514,633 | Schmidt | Nov. 11, 1924 |
| 2,185,014 | Elliott | Dec. 26, 1939 |